United States Patent
Kifuku

(12) 
(10) Patent No.: US 10,279,571 B2
(45) Date of Patent: May 7, 2019

(54) DECORATIVE MELAMINE BOARD

(75) Inventor: Toshinori Kifuku, Fujieda (JP)

(73) Assignee: SUMITOMO BAKELITE COMPANY LIMITED, Tokyo (JP)

( * ) Notice: Subject to any disclaimer, the term of this patent is extended or adjusted under 35 U.S.C. 154(b) by 1374 days.

(21) Appl. No.: 13/884,739

(22) PCT Filed: Nov. 25, 2011

(86) PCT No.: PCT/JP2011/077161
§ 371 (c)(1),
(2), (4) Date: May 10, 2013

(87) PCT Pub. No.: WO2012/073812
PCT Pub. Date: Jun. 7, 2012

(65) Prior Publication Data
US 2013/0230712 A1    Sep. 5, 2013

(30) Foreign Application Priority Data
Nov. 30, 2010    (JP) ................. 2010-267733

(51) Int. Cl.
*B32B 17/02*    (2006.01)
*B32B 27/42*    (2006.01)
(Continued)

(52) U.S. Cl.
CPC ............. *B32B 27/42* (2013.01); *B32B 5/16* (2013.01); *B32B 17/02* (2013.01); *B32B 17/04* (2013.01);
(Continued)

(58) Field of Classification Search
CPC . B32B 2307/5526; B32B 17/02; B32B 17/04; B32B 17/10743; B32B 17/1077;
(Continued)

(56) References Cited

U.S. PATENT DOCUMENTS 3,589,974 A    6/1971    Albrinck et al.
4,801,495 A *  1/1989    van der Hoeven ........... 442/412
(Continued)

FOREIGN PATENT DOCUMENTS

CN    1809454 A        7/2006
CN    101165075 A *    4/2008
(Continued)

OTHER PUBLICATIONS

Toshinori et al (JP 2001-096702), Oct. 2001.*
(Continued)

*Primary Examiner* — Lawrence D Ferguson
(74) *Attorney, Agent, or Firm* — Westerman, Hattori, Daniels & Adrian, LLP

(57) ABSTRACT

The present invention provides a decorative melamine board that maintains the surface hardness associated with melamine resin while having superior non-combustibility, being able to accommodate reductions in thickness and having superior bending workability at normal temperatures. The decorative melamine board has a structure obtained by laminating a surface layer and a core layer. The surface layer includes a surface layer material composed of a surface layer base material that carries a resin containing a melamine resin on a first surface side serving as a design surface, and carries a solid content of a thermoplastic resin emulsion on a second surface side that contacts the core layer. The core layer includes a core layer material composed of glass cloth or a prepreg having glass cloth as a base material thereof.

11 Claims, 2 Drawing Sheets

(51) Int. Cl.
*B32B 29/02* (2006.01)
*B32B 5/16* (2006.01)
*B32B 17/04* (2006.01)
*B32B 17/10* (2006.01)

(52) U.S. Cl.
CPC .... *B32B 17/1077* (2013.01); *B32B 17/10743* (2013.01); *B32B 29/02* (2013.01); *B32B 2250/02* (2013.01); *B32B 2255/02* (2013.01); *B32B 2255/12* (2013.01); *B32B 2255/26* (2013.01); *B32B 2262/101* (2013.01); *B32B 2264/102* (2013.01); *B32B 2305/076* (2013.01); *B32B 2307/3065* (2013.01); *B32B 2307/554* (2013.01); *B32B 2307/558* (2013.01); *B32B 2451/00* (2013.01); *B32B 2479/00* (2013.01); *Y10T 428/249921* (2015.04); *Y10T 428/254* (2015.01); *Y10T 428/266* (2015.01)

(58) Field of Classification Search
CPC ............ B32B 2250/02; B32B 2255/02; B32B 2255/12; B32B 2255/26; B32B 2262/101; B32B 2264/102; B32B 2305/076; B32B 2307/3065; B32B 2307/554; Y10T 428/249921; Y10T 428/254; Y10T 428/266
USPC ......................................................... 428/212
See application file for complete search history.

(56) References Cited

U.S. PATENT DOCUMENTS

| | | | |
|---|---|---|---|
| 5,997,136 A | 12/1999 | Fujisawa et al. | |
| 2006/0068175 A1* | 3/2006 | Karam et al. | ............ 428/195.1 |

FOREIGN PATENT DOCUMENTS

| | | |
|---|---|---|
| JP | 3-253342 A | 11/1991 |
| JP | 08-512255 A | 12/1996 |
| JP | 9-150481 A | 6/1997 |
| JP | 10-305526 A | 11/1998 |
| JP | 11-268186 A | 10/1999 |
| JP | 2001-096702 A | 4/2001 |
| JP | 2005-68202 A | 3/2005 |
| JP | 2005-262449 A | 9/2005 |
| JP | 2005-343153 A | 12/2005 |
| JP | 2006-247982 A | 9/2006 |
| JP | 2008-238481 A | 10/2008 |
| JP | 2009-001022 A | 1/2009 |
| JP | 4354003 B2 | 10/2009 |
| JP | 2010-228116 A | 10/2010 |
| JP | 2010-228179 A | 10/2010 |
| KR | 10-0404132 B1 | 10/2003 |
| KR | 10-0644108 B1 | 11/2006 |
| TW | 460387 B | 10/2001 |
| WO | 95/06568 | 3/1995 |

OTHER PUBLICATIONS

Tony Whelan, Polymer Technology Dictionary, 1994, 1st edition, p. 242, paragraphs 5-6. (Year: 1994).*
https://www.dictionary.com/browse/emulsion?s=t, 2011. (Year: 2011).*
Extended European Search Report dated Jun. 16, 2014, issued in European Patent Application No. 11845057.6 (6 pages).
Chinese Office Action dated Jun. 27, 2014, issued in Chinese Patent Application No. 201180056139.2, w/English translation (17 pages).
Decision for Grant of Patent dated Apr. 27, 2015, issued in corresponding Korean Patent Application No. 10-2013-7013617, with English translation (3 pages).
Korean Office Action dated Oct. 24, 2014, issued in corresponding KR Application No. 10-2013-7013617 with English translation (9 pages).
Internationl Search Report for PCT/JP2011/077161, dated Dec. 27, 2011.
Office Action dated Jun. 22, 2015, issued in counterpart Taiwanese application No. 100143523 (w/abstract and English translation) (11 pages).
Office Action dated Jun. 17, 2015, issued in counterpart European application No. 11845057.6 (7 pages).
Office Action dated Aug. 25, 2015, issued in counterpart European application No. 11845057.6 (7 pages).

* cited by examiner though it was heated, because the finished product is too thick, and could not actually be used easily in fields that simultaneously require non-combustibility and bending workability.

DECORATIVE MELAMINE BOARD

TECHNICAL FIELD

The present invention relates to a decorative melamine board.

The present application claims priority based on Japanese Patent Application No. 2010-267733, filed in Japan on Nov. 30, 2010, the contents of which are incorporated herein by reference.

BACKGROUND ART

Melamine decorative boards are decorative boards in which a surface layer (decorative layer) having a melamine resin is formed on the surface thereof, and are used in various fields in applications such as furniture, interior walls or vehicle interiors due to their favorable hardness, water resistance, soiling resistance and scratch resistance.

Since decorative melamine boards using a typical melamine resin have a hard surface hardness, they are unsuitable for post-forming (secondary forming) applications such as bending. In recent years, however, melamine resin for post-forming has been developed that is compatible with bending applications, and post-formable decorative boards using this resin can be bent when heated, enabling them to be used in applications such as doors. Moreover, the use of kraft paper or aluminum impregnated with phenol resin for the linings of decorative melamine boards enables the production of various combinations of decorative melamine boards according to the particular application. For example, Patent Document 1 discloses a decorative melamine board that combines aluminum with a surface layer composed of melamine resin-impregnated paper that uses a melamine resin for post-forming. In addition, decorative melamine panels also include non-combustible decorative melamine boards that have become popular as materials for kitchen panels, and these currently consist mainly of non-combustible decorative melamine boards having the specifications of decorative boards using a glass fiber base material, fine aluminum hydroxide powder and the like.

However, in the decorative melamine board disclosed in Patent Document 1, a layer of kraft paper impregnated with phenol resin is required to adhere the decorative melamine layer and the aluminum, and due to the presence of this phenol resin layer, the thickness of the decorative melamine board increases. Consequently, it becomes difficult to reduce the thickness of the decorative melamine board and bending workability is limited, with bending workability being limited to a bending radius R of 4 mm even if heated.

In addition, in the case of a non-combustible decorative melamine board having the specifications of the decorative board described above, since the finished product is excessively thick, it is unable to demonstrate flexibility even if heated, and since it is highly rigid, it is unable to be easily used practically in fields simultaneously requiring non-combustibility and bending workability.

PRIOR ART DOCUMENTS

Patent Documents

Patent Document 1: Japanese Unexamined Patent Application, First Publication No. 2001-96702

SUMMARY OF INVENTION

Problems to be Solved by the Invention

With the foregoing in view, an object of the present invention is to provide a decorative melamine board that maintains the surface hardness associated with melamine resin while having superior non-combustibility, being able to accommodate reductions in thickness and having superior bending workability at normal temperatures.

Means for Solving the Problems

The aforementioned object is achieved by the inventions (1) to (10) indicated below.

(1) A decorative melamine board having a structure obtained by laminating a surface layer and a core layer, wherein the surface layer comprises a surface layer material composed of a surface layer base material that carries a resin containing a melamine resin on a first surface side serving as a design surface, and carries a solid content of a thermoplastic resin emulsion on a second surface side that contacts the core layer, and the core layer comprises a core layer material composed of glass cloth or a prepreg having glass cloth as a base material thereof.

(2) The decorative melamine board described in (1) above, wherein the total thickness is 0.4 mm or less.

(3) The decorative melamine board described in (1) or (2) above, wherein the thickness of the core layer is 100 μm to 350 μm.

(4) The decorative melamine board described in any of (1) to (3) above, wherein the solid content of the thermoplastic resin emulsion contains emulsion resin particles having a mean particle diameter of 30 nm to 100 nm.

(5) The decorative melamine board described in any of (1) to (4) above, wherein the solid content of the thermoplastic resin emulsion is non-water-soluble.

(6) The decorative melamine board described in any of (1) to (5) above, wherein the solid content of the thermoplastic resin emulsion contains urethane-acrylic composite particles having a heterogeneous phase structure consisting of an acrylic resin phase and urethane resin phase in a single particle thereof.

(7) The decorative melamine board described in (6) above, wherein the urethane-acrylic composite particles are of the aqueous clear type having a core-shell structure consisting of an acrylic component for the core and a urethane component for the shell.

(8) The decorative melamine board described in any of (1) to (7) above, wherein the prepreg having glass cloth as a base material thereof is obtained by impregnating glass cloth with a resin composition containing 10% by weight to 50% by weight of a thermoplastic resin in terms of the solid content thereof.

(9) The decorative melamine board described in (8) above, wherein the thermoplastic resin contains an acrylic resin and/or a urethane resin.

(10) The decorative melamine board described in any of (1) to (9) above, having bending workability such that the minimum bending radius R at normal temperature (normally about 20° C. to 30° C.) is 10 mm or less.

Effects of the Invention

According to the present invention, a decorative melamine board can be provided that maintains surface hardness associated with melamine resin while having superior non-combustibility, being able to accommodate reductions in thickness and having superior bending workability at normal temperatures.

DESCRIPTION OF EMBODIMENTS

The decorative melamine board of the present invention is a decorative melamine board having a structure obtained by laminating a surface layer and a core layer, wherein the surface layer comprises a surface layer material composed of a surface layer base material that carries a resin containing a melamine resin on a first surface side serving as a design surface, and carries a solid content of a thermoplastic resin emulsion on a second surface side that contacts the core layer, and the core layer comprises a core layer material composed of glass cloth or a prepreg having glass cloth as a base material thereof.

The following provides a detailed explanation of an example of the configuration of the decorative melamine board of the present invention based on the drawings.

Figure 1:
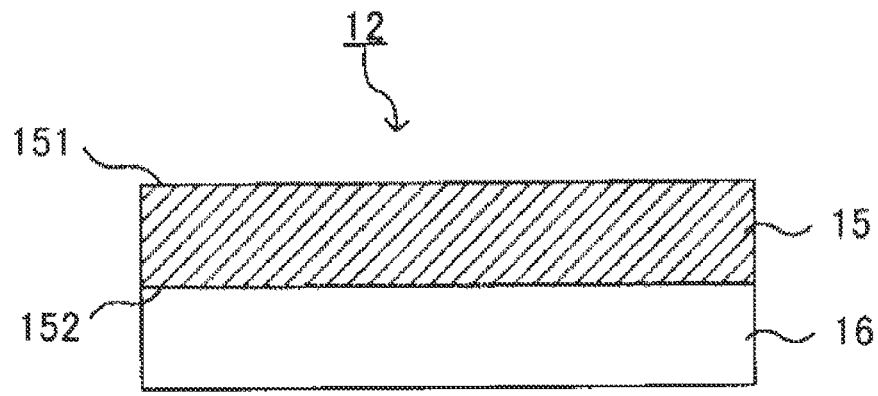
FIG. 1 is a conceptual drawing showing an example of the configuration of the decorative melamine board of the present invention.
Figure 2:
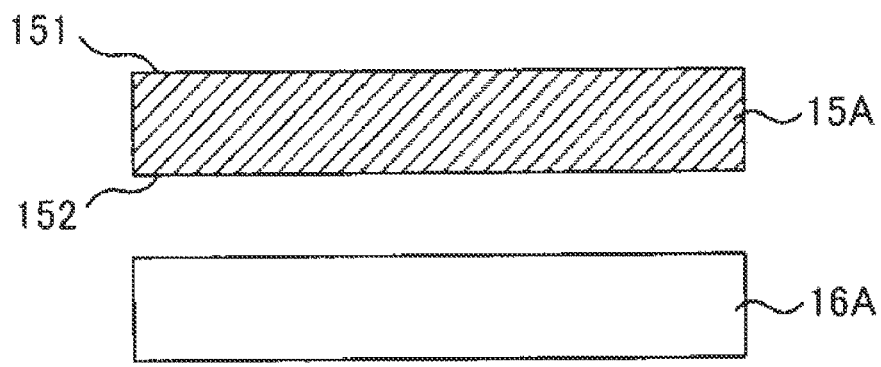
FIG. 2 is a drawing for explaining an example of a production method of the decorative melamine board of the present invention.
Figure 2:
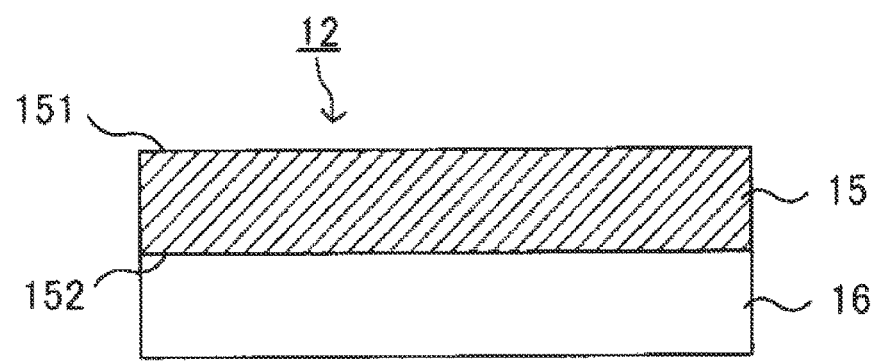

As one example of the decorative melamine board of the present invention, the configuration of a decorative melamine board 12 is shown in FIG. 1 that comprises a surface layer 15 and a core layer 16. In addition, as an example of a production method of a decorative melamine board, an example of a production method of the decorative melamine board 12 is shown in FIG. 2. In the example shown in FIG. 2, the decorative melamine board 12 is obtained by superimposing a surface layer material 15A and a core layer material 16A and laminating the two layers by heated pressure molding.

<1. Surface Layer>

The surface layer 15 is composed of the surface layer material 15A, and this surface layer material 15A is arranged on the design surface side (surface on the exposed side) of the decorative melamine board 12 of the present invention. The surface layer material 15A is composed of a surface layer base material that carries a resin containing a melamine resin on a first surface side 151 serving as a design surface, and carries a solid content of a thermoplastic resin emulsion on a second surface side 152 that contacts the core layer 16.

Furthermore, in the present invention, the carrying of a resin by the surface layer base material refers to a state in which a resin is adhered to a base material (carrier) or impregnated into voids within a base material, and the function of the carried resin is expressed following molding of the surface layer base material. Furthermore, the resin is not required to be uniformly dispersed on the surface of the base material or within the base material.

The aforementioned surface layer base material is a base material in the form of a sheet in which the design surface is formed on the first surface side 151. Although there are no particular limitations thereon, the material of the aforementioned surface layer base material preferably uses pulp, linter, synthetic fiber or glass fiber and the like. A titanium oxide-containing decorative sheet and the like that contains a pigment such as titanium oxide can also be used as necessary.

Although there are no particular limitations thereon, the basis weight of the aforementioned surface layer base material is preferably 40 $g/m^2$ to 150 $g/m^2$. If the basis weight is less than the aforementioned lower limit value, coating treatment becomes difficult due to problems with poor coverage and wrinkles in the resin impregnation step, while also making it difficult to adjust the impregnated amounts of resin carried on the first surface and second surface, respectively. On the other hand, if the basis weight exceeds the aforementioned upper limit value, the impregnated amount of resin carried by the surface layer base material becomes uneven, which together with lowering flexibility of the decorative melamine board 12, results in decreased productivity and increased costs, thereby making this undesirable.

The surface layer material 15A used in the present invention is obtained by carrying a resin containing a melamine resin on the first surface side 151 of the surface layer base material. As a result, preferable surface hardness can be imparted to the surface on the first surface side 151 of the surface layer material 15A, namely the surface of the decorative melamine board.

Although there are no particular limitations thereon, a melamine resin obtained by reacting melamine and formaldehyde under neutral or weakly alkaline conditions can be used for the melamine resin. Although there are no particular limitations on the reaction molar ratio of formaldehyde to melamine (value of (molar amount of formaldehyde)/(molar amount of melamine), and hereinafter to simply be referred to as the "reaction molar ratio"), a melamine resin obtained by reacting at reaction molar ratio of 1.0 to 4.0, preferably 1.0 to 2.0, and even more preferably 1.1 to 1.8, can be used preferably. If the reaction molar ratio is less than the aforementioned lower limit value, the amount of unreacted components increases resulting in decreased storage stability and increased costs, while if the reaction molar ratio exceeds the aforementioned upper limit value, resin flexibility decreases considerably after curing. Furthermore, one type of melamine resin can be contained alone, or two or more types of melamine resins having different reaction molar ratios or weight average molecular weights and the like can be contained as a mixture for use as the melamine resin.

In addition, a commercially available melamine resin can also be used for the melamine resin, an example of which is melamine resin manufactured by Sumitomo Chemical Co., Ltd.

Although there are no particular limitations thereon, the weight average molecular weight of the melamine resin is preferably 200 to 500 and particularly preferably 250 to 350. If the molecular weight is less than the aforementioned lower limit value, the unreacted portion increases and storage stability decreases, while if the molecular weight exceeds the aforementioned upper limit value, impregnability of the melamine resin into the base material decreases. Furthermore, the aforementioned weight average molecular weight can be measured by, for example, gel permeation chromatography (GPC, standard: polystyrene).

Although there are no particular limitations thereon, the content of the aforementioned melamine resin in the resin carried on the first surface side 151 of the surface layer material 15A is preferably 80% by weight to 100% by weight and particularly preferably 95% by weight to 100% by weight. If the content of melamine resin is less than the aforementioned lower limit value, surface hardness and soiling resistance decrease.

Although there are no particular limitations on the method used to load the resin containing the aforementioned melamine resin on the first surface side 151 of the surface layer base material, an example thereof consists of coating a resin varnish, obtained by dissolving the aforementioned resin in a solvent, using a known coating device such as a spray device, shower device, kiss coater or comma coater, followed by heating and drying at about 80° C. to 130° C. Furthermore, 2% by weight to 6% by weight of the volatile component (solvent) preferably remains on the resin-impregnated paper after the aforementioned heating and drying based on a value of 100% by weight for the total weight of the resin-impregnated paper. As a result, handling of the resin-impregnated paper becomes easy, and during heated molding, resin flow of the melamine resin carried on the first surface side 151 improves, thereby resulting in favorable design appearance and surface gloss of the decorative board. If the volatile component is 2% or less, there is increased susceptibility to cracking of the resin-impregnated paper resulting in handling difficulty, or resin flow may decrease thereby impairing appearance and forming. In addition, in the case the volatile component is 6% or more, warping (curling) of the decorative board increases easily in the drying environment following molding, and if the volatile content is 7.5% or more, the volatile component has an effect on gloss transferability in the appearance of the decorative board.

There are no particular limitations on the solvent used to dissolve the resin containing the aforementioned melamine resin, and examples thereof include water and methanol. Water is particularly preferable. In addition, a poor solvent may also be used within a range that does not have a detrimental effect. Although there are no particular limitations thereon, the solid content of the aforementioned resin varnish (all components excluding the solvent) is preferably 30% by weight to 70% by weight, and particularly preferably 45% by weight to 60% by weight, of the aforementioned resin varnish. As a result, impregnability of the resin varnish into the base material can be improved.

The surface layer material 15A of the present invention is obtained by loading the solid content of a thermoplastic resin emulsion on a second surface side 152 on the opposite side from the design surface of the surface layer base material. Furthermore, in the present invention, a thermoplastic resin emulsion refers to that which contains a thermoplastic resin and is in the state of an emulsion obtained by dispersing the thermoplastic resin in a solvent. In addition, the solid content of a thermoplastic resin emulsion refers to the component remaining after removing the solvent from the thermoplastic resin emulsion.

The solid content of the thermoplastic resin emulsion contains a component that is present in the form of emulsion resin particles, has adhesive properties with metal and various types of materials, and imparts flexibility to the decorative melamine board. Thus, as a result of loading the solid content of the thermoplastic resin emulsion on the second surface side 152, adhesive strength between the surface layer 15 and the core layer 16 can be improved, and bending workability of the decorative melamine board can be improved.

Although there are no particular limitations thereon, examples of the solid content of the aforementioned thermoplastic resin emulsion include emulsion particles of thermoplastic resins such as acrylic resin, urethane resin, vinyl acetate-based copolymers, urethane-acrylic composite particles, styrene-butadiene rubber (SBR) and nitrile rubber (NBR). Among these, urethane-acrylic composite particles are preferable. In the present invention, urethane-acrylic composite particles refer to particles having a heterogeneous phase structure consisting of an acrylic resin phase and urethane resin phase in a single particle thereof. Since urethane resin and acrylic resin each demonstrate high adhesive strength with the core layer, the use of urethane-acrylic composite particles makes it possible to demonstrate favorable adhesive strength with the core layer. Moreover, urethane resin has particularly superior toughness, resiliency and flexibility, while acrylic resin has particularly superior transparency, durability, weather resistance, chemical resistance and film formability. In addition, in the present invention, a "heterogeneous phase structure" refers to a structure in which a plurality of phases are present that are composed of different types of resins within a single particle, and examples thereof include a core-shell structure, local structure and sea-island structure. In addition, although there are no particular limitations thereon, an example of the state of the inter-particle arrangement of the aforementioned urethane-acrylic composite particles when loaded on the first surface side 151 of the surface layer material 15A is a straight chain structure. The particle structure and inter-particle arrangement can be confirmed with, for example, a scanning electron microscope (SEM). Among these particles, the aforementioned urethane-acrylic composite particles are particularly preferable as an aqueous clear type having a core-shell structure consisting of an acrylic component for the core and a urethane component for the shell. If the urethane-acrylic composite particles employ the aforementioned core-shell structure, since the surface exterior has a urethane composition when loaded on the second surface side 152 of the surface layer material 15A, and the second surface side 152 of the surface layer material 15A has the properties of both urethane resin and acrylic resin while the properties of the urethane resin are imparted to the exterior. Furthermore, in the present invention, an "aqueous clear type" refers to an aqueous resin solution in which the resin liquid is water-soluble while the coated film obtained after evaporating the moisture is non-water-soluble, and has transparency to a degree that the color and pattern of the substrate can be clearly distinguished. As a result of the resin carried on the second surface side 152 of the surface layer material 15A being of the aqueous clear type, effects of the surface layer on the color tone of the design surface can be inhibited.

Furthermore, one type of the aforementioned thermoplastic resins can be contained alone, or two or more different types of the aforementioned thermoplastic resins can be contained by mixing, for use as the solid content of the thermoplastic resin emulsion.

In addition, the solid content of the thermoplastic resin emulsion may also contain a small amount of thickener, penetration enhancer or antifoaming agent and the like as necessary in addition to emulsion particles of the aforementioned thermoplastic resin.

The solid content of the aforementioned thermoplastic resin emulsion preferably contains emulsion resin particles having a mean particle diameter of 30 nm to 100 nm, and the mean particle diameter of the aforementioned emulsion resin particles is particularly preferably 60 nm to 90 nm. As a result, impregnability of the surface layer base material between fibers improves, and since the emulsion resin particles can more effectively impregnate the surface layer base material, favorable flexibility can be imparted to the surface layer.

In addition, the solid content of the aforementioned thermoplastic resin emulsion is preferably non-water-soluble. As a result, the solid content of the thermoplastic resin emulsion is able to migrate to the first surface side 151 of the surface layer material 15A, mix with the melamine resin carried on the first surface side 151, and prevent impairment of surface performance caused by the melamine resin of the first surface side 151.

Although there are no particular limitations thereon, the method used to load the solid content of the thermoplastic resin emulsion on the second surface side 152 of the surface layer base material can be carried out in the same manner as the method used to load the melamine resin on the first surface side 151 of the surface layer base material. In other words, an example of such a method consists of coating the aforementioned thermoplastic resin emulsion in the state of an emulsion dissolved in a solvent followed by heating and drying. Furthermore, 2% by weight to 6% by weight of the volatile component preferably remains in the resin-impregnated paper following the aforementioned heating and drying when based on a value of 100% by weight for the total weight of the resin-impregnated paper. As a result, handling of the resin-impregnated paper becomes easy, and during heated molding, resin flow of the melamine resin carried on the first surface side 151 improves, thereby resulting in favorable design appearance and surface gloss of the decorative board.

There are no particular limitations on the solvent used in the aforementioned thermoplastic resin emulsion, and an example thereof is water. In addition, a poor solvent may also be used within a range that does not have a detrimental effect.

Although there are no particular limitations thereon, the solid content of the aforementioned thermoplastic resin emulsion (all components excluding the solvent) is preferably 25% by weight to 60% by weight, and particularly preferably 30% by weight to 45% by weight, of the aforementioned thermoplastic resin emulsion. As a result, impregnability of the thermoplastic resin emulsion into the base material can be improved.

<2. Core Layer>

The decorative melamine board 12 is obtained by laminating the core layer 16 onto the second surface side 152 of the surface layer 15.

The aforementioned core layer 16 is comprised of a core layer material 16A composed of glass cloth or a prepreg having glass cloth as a base material thereof. As a result, heat resistance, non-combustibility, rigidity and the like can be imparted to the decorative melamine board.

Although there are no particular limitations thereon, examples of the glass cloth include glass woven fabric and glass non-woven fabric, with glass fabric being particularly preferable from the viewpoints of non-combustibility and strength.

In addition, examples of the glass that composes the glass cloth include E glass, C glass, A glass, S glass, D glass, NE glass, T glass and H glass, with T glass being particularly preferable. As a result, the coefficient of thermal expansion of the glass cloth can be lowered.

Although there are no particular limitations thereon, the weight of the aforementioned glass cloth is preferably a basis weight of 100 g/m$^2$ or more in the case it is necessary to satisfy non-combustibility compatibility requirements of Article 2, Item 9 of the Building Standard Law which states that non-combustible materials must not contain cracks or holes following combustion. In addition, although there are no particular limitations thereon, the upper limit of weight is preferably a basis weight of 250 g/m$^2$ or less from the viewpoints of material cost and workability.

There are no particular limitations on the aforementioned prepreg, and for example, a prepreg can be used that is obtained by impregnating the aforementioned glass cloth with a resin composition containing a thermoplastic resin and the like. Although there are no particular limitations on the aforementioned resin composition provided the interlayer adhesive strength between the second surface side 152 of the aforementioned surface layer 15 and the core layer 16 is sufficient for forming the decorative melamine board 12, that containing the solid content of a thermoplastic resin at 10% by weight to 50% by weight is preferable, while that containing the aforementioned solid content of a thermoplastic resin at 20% by weight to 35% by weight is particularly preferable. As a result, interlayer adhesive strength between the second surface side 152 of the aforementioned surface layer 15 and the core layer 16 can be improved.

Although there are no particular limitations thereon, examples of the aforementioned thermoplastic resin include acrylic resin, urethane resin, ethylene vinyl acetate resin and styrene-butadiene rubber (SBR). Among these, acrylic resin and urethane resin are preferable.

The aforementioned prepreg can be produced by a conventionally known method, and can be obtained by, for example, impregnating glass cloth similar to that previously described with a varnish obtained by dissolving the aforementioned resin composition in a solvent followed by drying.

In addition, adhesive strength can be further improved and high normal temperature bending workability can be achieved by further loading a thermoplastic resin emulsion on the surface side of the aforementioned core layer material 16A that contacts the surface layer material 15A. Furthermore, there are no particular limitations on the solid content of the thermoplastic resin emulsion carried on the surface side of the core layer material 16A that contacts the surface layer material 15A provided it imparts non-combustibility and does not impair the calorific value or gas toxicity during combustion. In addition, there are no particular limitations on the mean particle diameter of emulsion resin particles contained by the solid content of the thermoplastic resin emulsion, and they may be water-soluble or non-water-soluble.

The thickness of the core layer 16 is preferably 100 μm or more. As a result, adequate heat resistance and non-combustibility can be imparted to the decorative melamine board 12. In addition, although there are no particular limitations thereon, the upper limit of thickness is preferably set within an acceptable range in consideration of the final product design since the thickness and weight as well as cost of the decorative melamine board 12 increase as thickness increases, and is preferably 350 μm or less. Thus, the thickness of the core layer 16 is preferably 100 μm to 350 μm.

<3. Decorative Melamine Board>

The decorative melamine board 12 is obtained by superimposing the aforementioned surface layer material 15A and the core material layer 16A in a prescribed order, followed by laminating by heated pressure molding.

Although there are no particular limitations on the conditions used during heated pressure molding of the decorative melamine board 12, an example thereof consists of carrying out heated pressure molding at a temperature of 130° C. to 150° C. and a pressure of 2 MPa to 8 MPa for 10 minutes to 60 minutes.

In addition, during molding of the decorative melamine board 12, a mirrored finish can be obtained by superimposing a mirrored finish board on the first surface side of the surface layer material 15A, while an embossed finish can be obtained by superimposing an embossed board or embossed film.

Figure 3:
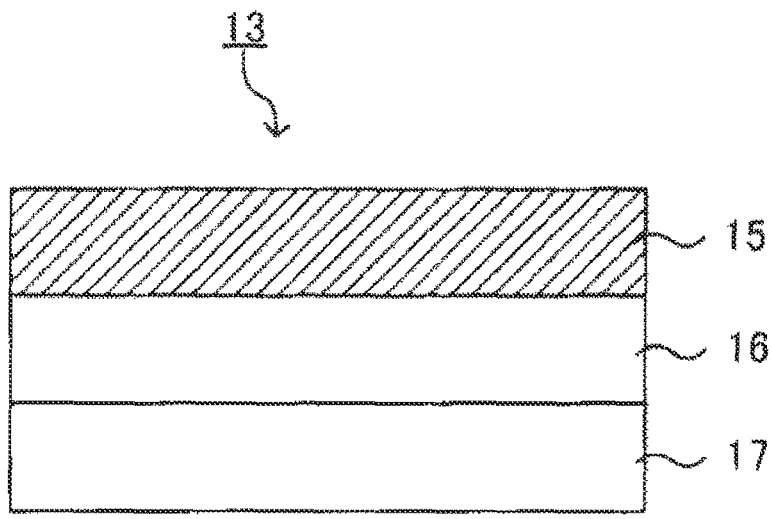
FIG. 3 is a conceptual drawing showing another example of the configuration of the decorative melamine board of the present invention.
Figure 4:
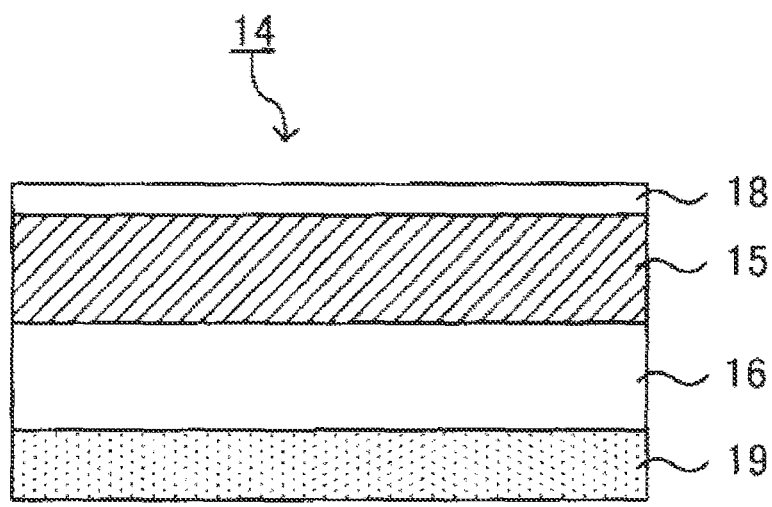
FIG. 4 is a conceptual drawing showing another example of the configuration of the decorative melamine board of the present invention.

Furthermore, the decorative melamine board of the present invention is not limited to the form of the decorative melamine board 12 shown in FIGS. 1 and 2. For example, in the case of desiring to impart mechanical strength and the like, a three-layer configuration can be employed consisting of the surface layer 15, the core layer 16 and a core layer 17 in which a different core layer material is laminated on the lower side of the core layer 16 to obtain a two-layer laminate of core layer materials as shown in FIG. 3. In addition, the decorative melamine board of the present invention may also have a different layer other than the surface layer and the core layer, and may have a protective layer 18 for the outermost layer on the design surface side or a support layer 19 for the outermost layer on the core layer side as shown in FIG. 4.

Although there are no particular limitations thereon, the aforementioned protective layer 18 can be obtained either by containing a melamine resin alone in a paper base material having a basis weight of 10 g/m$^2$ to 50 g/m$^2$, or by impregnating a resin composition containing an inorganic filler selected from the group consisting of aluminum hydroxide, magnesium hydroxide and silica in a melamine resin, followed by drying.

There are no particular limitations on the aforementioned support layer 19, and for example, a prepreg, obtained by impregnating a base material similar to that used for the surface layer base material with the aforementioned resin able to be used on the first surface side or second surface side of the surface layer base material, or a metal foil and the like, can be used.

Although the decorative melamine board of the present invention can be subjected to bending processing at a minimum bending radius R of 10 mm or less at normal temperatures (normally about 20° C. to 30° C.), there are no particular limitations thereon. The minimum bending radius R refers to the radius R of the smallest shape able to be obtained by a 100% acceptable product without the occurrence of cracking or other defects even when repeatedly subjected to normal temperature bending processing carried out in a single direction along a shape having a bent portion of radius R.

EXAMPLES

Although the following provides a detailed explanation of the present invention based on examples and comparative examples thereof, the present invention is not limited thereto.

Example 1

An emulsion of urethane-acrylic composite particles (Chirika Co., Ltd., SU-100, mean particle diameter: 84 nm, dispersion medium: water) was coated onto the second surface side of titanium oxide-containing decorative paper (Dai Nippon Printing Co., Ltd.), used as a surface layer base material and having a basis weight of 80 g/m$^2$, to a solid content of 40 g/m$^2$, followed by coating a melamine resin (reaction molar ratio: 1.4, resin solid content: 50% by weight) onto the first surface side of the aforementioned decorative paper at 50 g/m$^2$, and drying for 90 seconds with a hot air dryer at 120° C. to obtain a surface layer base material having a resin ratio of 53% and volatile component ratio of 3%. Furthermore, the aforementioned melamine resin was synthesized by a method consisting of charging raw material melamine and formalin into a reaction tank at a prescribed blending ratio and adding a catalyst, followed by reacting while refluxing after raising the temperature to the boiling point to complete dissolution of the melamine, subjecting to dehydration treatment after having reached the reaction endpoint to adjust the resin solid content, and cooling.

A core layer in the form of glass cloth having a thickness of 0.2 mm (Nan Ya Plastics Corp., WEA7628) was then superimposed on the second surface side of the resulting surface layer material followed by subjecting to heated pressure molding for 40 minutes under conditions of 140° C. and 2 MPa to obtain a decorative melamine board (1) having a thickness of 0.3 mm.

Example 2

A decorative melamine board (2) having a thickness of 0.3 mm was obtained in the same manner as Example 1 with the exception of fabricating a prepreg having a resin ratio of 25% and volatile component ratio of 3% by coating an emulsion of urethane-acrylic composite particles (Chirika Co., Ltd., SU-100, mean particle diameter: 84 nm, dispersion medium: water) onto glass cloth having a thickness of 0.2 mm (Nan Ya Plastics Corp., WEA7628) at a solid content of 70 g/m$^2$, followed by drying for 150 seconds in a hot air dryer at 120° C., and using this prepreg for the core layer.

Example 3

A prepreg having a resin ratio of 40% and volatile component ratio of 4% was fabricated by coating an emulsion of urethane-acrylic composite particles (Chirika Co., Ltd., SU-100, mean particle diameter: 84 nm, dispersion medium: water) onto the front and back sides of titanium oxide-containing thin paper having a basis weight of 80 g/m$^2$ at a solid content of 50 g/m$^2$, followed by drying for 60 seconds in a hot air dryer at 120° C. After combining this prepreg with the decorative melamine board obtained in Example 1 and a glass cloth base material having a thickness of 0.2 mm (Nan Ya Plastics Corp., WEA7628) so as to interpose the glass cloth base material there between, the laminate was subjected to heated pressure molding under the same conditions as Example 1 to obtain a decorative melamine board (3) having a thickness of 0.4 mm.

Comparative Example 1

After coating a general-purpose melamine resin (reaction molar ratio: 1.8, resin solid content: 52% by weight) onto the titanium oxide-containing decorative paper of the surface layer base material (basis weight: 80 g/m$^2$) used in Example 1 by dipping the front and back sides of the decorative paper to impregnate therein so that the resin solid content was 100 g/m², the coated decorative paper was dried for 90 seconds in a hot air dryer at 120° C. to obtain a surface layer base material having a resin ratio of 55% and volatile component ratio of 6%.

Next, the aforementioned general-purpose melamine resin used for the surface layer was coated into bleached kraft paper having a basis weight of 200 g/m² (Toyo Fibre Co., Ltd., DLP-195) by dipping impregnation, followed by drying for 150 seconds with a hot air dryer at 130° C. to fabricate a prepreg having a resin ratio of 50% and volatile component ratio of 4%. A decorative melamine board (4) having a thickness of 0.3 mm was then obtained in the same manner as Example 1 with the exception of using the resulting prepreg for the core layer.

Comparative Example 2

A decorative melamine board (5) having a thickness of 0.3 mm was obtained in the same manner as Example 1 with the exception of using the same surface layer material as that of Comparative Example 1, and using a polyester non-woven fabric having a thickness of 0.2 mm (Asahi Kasei Corp., Spunbond Ill.) for the core layer.

The properties of the decorative melamine boards (1) to (5) obtained in the aforementioned Examples 1, 2 and 3 and Comparative Examples 1 and 2 were evaluated. The results are shown in Table 1.

(Test Methods)

1. Non-Combustibility Test

A non-combustibility test was carried out in accordance with the heat generation test and evaluation methods of Section (2)ii)4.10.2 and the gas toxicity test and evaluation methods of Section 4.10.3 of the non-combustibility performance test and evaluation methods stipulated in section 4.10 of the Fire Preventive and Fireproof Performance Test and Evaluation Procedure Manual of the operating procedures of the General Building Research Corporation of Japan.

Performance evaluation methods relating to certification based on the provisions of Article 2, Item 9 of the Building Standard Law are described in the aforementioned items of the aforementioned Fire Preventive and Fireproof Performance Test and Evaluation Procedure Manual.

2. Boiling Water Resistance Test

A boiling water resistance test was carried out according to a method that complies with the boiling test of JIS K6902, followed by confirming the presence or absence of blistering or interlayer separation in a test piece after immersing in boiling water for 2 hours.

3. Soiling Resistance Test

A soiling resistance test was carried out according to a method that complies with the stain resistance test of JIS K6902, followed by confirming the presence or absence of residual material soiling on a sample surface.

4. Bending Formability Test

Outward bending and inward bending at room temperature and bending radius R of 10 mm were carried out in compliance with the bending test (method A) of JIS K6902, followed by confirmation of the presence or absence of cracking of the decorative sheet surface.

5. Surface Hardness (Pencil Hardness) Test

Surface hardness was evaluated with a pencil hardness test in compliance with JIS K5600.

TABLE 1

| | | | Acceptance Criteria | Example 1 | Example 2 | Example 3 | Comp. Ex. 1 | Comp. Ex.2 |
|---|---|---|---|---|---|---|---|---|
| Surface layer | First surface side | | | Melamine resin | Melamine resin | Melamine resin | Melamine resin | Melamine resin |
| | Second surface side | | | Urethane-acrylic composite particles | Urethane-c acryli composite particles | Urethane-acrylic composite particles | Melamine resin | Urethane-acrylic composite particles |
| Core layer | | | | Glass cloth | Prepreg (glass cloth) | Glass cloth | Prepreg (kraft paper) | Polyester non-woven fabric |
| Support layer | | | | None | None | Prepreg (titanium oxide decorative paper) | None | None |
| Total thickness (mm) | | | | 0.3 | 0.3 | 0.4 | 0.3 | 0.3 |
| Pencil hardness | | | 5H | 8H | 8H | 8H | 8H | 8H |
| Boiling water resistance test | | | No blistering or interlayer separation | No defects | No defects | No defects | No defects | No defects |
| Non-combustibility test | Heat generation test | Total calorific value (MJ/m²) | 8 MJ/m² or less | 3.3 | 4.8 | 6.4 | 7.5 | 7.5 |
| | | Time beyond 200 KW/m² (sec) | Less than 10 sec | 0 | 0 | 0 | 0 | 0 |
| | | Cracks/holes reaching back surface | None | None | None | None | Present | Present |
| | Gas toxicity test | Mouse average movement discontinuation time (min) | 6.8 min or more | 15 | 15 | 15 | 10 | 10 |
| Soiling resistance test | | | Minor changes or less | No change | No change | No change | No change | No change |

TABLE 1-continued

|  | Acceptance Criteria | Example 1 | Example 2 | Example 3 | Comp. Ex. 1 | Comp. Ex. 2 |
|---|---|---|---|---|---|---|
| Bending formability test (R: 10 mm) | No cracking | No cracking | No cracking | No cracking | Cracking | No cracking |
| Overall evaluation |  | ○ | ○ | ○ | X | X |

Parentheses indicated after prepregs indicate the material used for the base material.

In Comparative Example 1, since a melamine resin was used for the resin carried on the second surface side of the surface layer instead of using the solid content of a thermoplastic resin emulsion, normal temperature bending workability of the decorative melamine board (4) was inferior.

In addition, in Comparative Examples 1 and 2, since a prepreg having kraft paper for the base material was used for the core layer in Comparative Example 1 and a polyester non-woven fabric was used in Comparative Example 2 instead of using glass cloth or a prepreg having glass cloth as a base material thereof, the decorative melamine boards (4) and (5) had inferior non-combustibility.

On the other hand, since the surface layer was comprised of a surface layer base material obtained by carrying a resin containing a melamine resin on the first side surface and carrying the solid content of a thermoplastic resin emulsion on the second side surface, and the core layer was comprised of a core layer material composed of glass cloth or a prepreg having glass cloth as a base material thereof, the decorative melamine boards (1), (2) and (3) obtained in Examples 1 to 3 demonstrated superior non-combustibility, were able to accommodate reductions in thickness, and demonstrated superior bending workability at normal temperatures. Moreover, the decorative melamine boards (1), (2) and (3) obtained in Examples 1 to 3 were superior in terms of the basic required quality of decorative boards in the form of surface hardness, boiling water resistance and soiling resistance.

INDUSTRIAL APPLICABILITY

The decorative melamine board of the present invention has favorable bending workability and non-combustibility and is able to accommodate reductions in thickness. Since a surface layer base material similar to that of conventional decorative boards can be used for the surface layer, the decorative melamine board of the present invention can be selected as desired from a wide range of colors and patterns, and can be applied in a wide range of applications, such as walls subjected to regulations on non-combustible materials as in public facilities and the like.

BRIEF DESCRIPTION OF THE REFERENCE SYMBOLS 12,13,14 Decorative melamine board
15 Surface layer
15A Surface layer material
151 First surface side
152 Second surface side
16 Core layer
16A Core layer material
17 Core layer
18 Protective layer
19 Support layer

The invention claimed is:

1. A decorative melamine board having a structure obtained by laminating a surface layer and a core layer, wherein
the surface layer comprises a surface layer material composed of a surface layer base material that carries a resin containing a melamine resin on a first surface side serving as a design surface, and carries a solid content of a thermoplastic resin emulsion on a second surface side that contacts the core layer, wherein the design surface is an outermost surface of the decorative melamine board, and
the core layer comprises a core layer material composed of glass cloth or a prepreg having glass cloth as a base material thereof, wherein the core layer consists of a prepreg having glass cloth impregnated with a thermoplastic resin.

2. The decorative melamine board according to claim 1, wherein the total thickness is 0.4 mm or less.

3. The decorative melamine board according to claim 1, wherein the thickness of the core layer is 100 μm to 350 μm.

4. The decorative melamine board according to claim 1, wherein the solid content of the thermoplastic resin emulsion contains emulsion resin particles having a mean particle diameter of 30 nm to 100 nm.

5. The decorative melamine board according to claim 1, wherein the solid content of the thermoplastic resin emulsion is non-water-soluble.

6. The decorative melamine board according to claim 1, wherein the solid content of the thermoplastic resin emulsion contains urethane-acrylic composite particles having a heterogeneous phase structure consisting of an acrylic resin phase and urethane resin phase in a single particle thereof.

7. The decorative melamine board according to claim 6, wherein the urethane-acrylic composite particles are of the aqueous clear type having a core-shell structure consisting of an acrylic component for the core and a urethane component for the shell.

8. The decorative melamine board according to claim 1, wherein the prepreg having glass cloth as a base material thereof is obtained by impregnating glass cloth with a resin composition containing 10% by weight to 50% by weight of a thermoplastic resin in terms of the solid content thereof.

9. The decorative melamine board according to claim 8, wherein the thermoplastic resin contains an acrylic resin and/or a urethane resin.

10. The decorative melamine board according to claim 1, having bending workability such that the minimum bending radius R at normal temperature (normally about 20° C. to 30° C.) is 10 mm or less.

11. The decorative melamine board according to claim 1, wherein the core layer consists of glass cloth.

* * * * *